US011899236B2

United States Patent
Wu et al.

(10) Patent No.: US 11,899,236 B2
(45) Date of Patent: Feb. 13, 2024

(54) DISPLAY BACKLIGHT WITH TRANSPARENT LIGHT GUIDE

(71) Applicant: MAANSHAN-JINGZHI TECHNOLOGY CO LTD, Anhui (CN)

(72) Inventors: Peng Wu, Jiangsu (CN); Yulei Chen, Jiangsu (CN); Ruirui Zhang, Jiangsu (CN); Tong Li, Jiangsu (CN)

(73) Assignee: MAANSHAN-JINGZHI TECHNOLOGY CO LTD, Anhui (CN)

( * ) Notice: Subject to any disclaimer, the term of this patent is extended or adjusted under 35 U.S.C. 154(b) by 0 days.

(21) Appl. No.: 17/916,587

(22) PCT Filed: Apr. 9, 2021

(86) PCT No.: PCT/CN2021/000074
§ 371 (c)(1),
(2) Date: Oct. 3, 2022

(87) PCT Pub. No.: WO2021/203771
PCT Pub. Date: Oct. 14, 2021

(65) Prior Publication Data
US 2023/0152507 A1      May 18, 2023

(30) Foreign Application Priority Data

Apr. 10, 2020   (CN) .......................... 202010278218.9

(51) Int. Cl.
*G02F 1/13357*    (2006.01)
*F21V 8/00*       (2006.01)

(52) U.S. Cl.
CPC ......... *G02B 6/0043* (2013.01); *G02B 6/0055* (2013.01); *G02F 1/133615* (2013.01)

(58) Field of Classification Search
CPC .. G02B 6/0043; G02B 6/0011; G02B 6/0033; G02B 6/0035; G02B 6/0036;
(Continued)

(56) References Cited

U.S. PATENT DOCUMENTS

| 5,408,388 A | * | 4/1995 | Kobayashi | ........... G02B 6/0055 362/613 |
| 5,550,657 A | * | 8/1996 | Tanaka | ................. G02B 6/0055 362/330 |

(Continued)

FOREIGN PATENT DOCUMENTS

| CN | 108061931 | 5/2018 |
| CN | 108519637 | 9/2018 |

(Continued)

OTHER PUBLICATIONS

"International Search Report (Form PCT/ISA/210) of PCT/CN2021/000074", dated Jul. 2, 2020, with English translation thereof, pp. 1-4.

*Primary Examiner* — Ismael Negron
(74) *Attorney, Agent, or Firm* — JCIPRNET

(57) ABSTRACT

A transparent light source system for a display device comprises a light source, and a light guide plate which includes an incident surface opposite to the light source, an upper surface, a lower surface parallel to the upper surface, and a lateral surface opposite to the incident surface. An outer light guide film is disposed outside the upper surface, first optical micro-structures allowing light transmitted in the light guide plate to be emitted from the upper surface are disposed on the upper surface, second optical micro-structures opposite to the first optical micro-structures are disposed on an inner surface of the outer light guide film, and the second optical micro-structures allow light emitted out (Continued)

of the first optical micro-structures to be emitted from an outer surface of the outer light guide film.

16 Claims, 17 Drawing Sheets

(58) Field of Classification Search
CPC .... G02B 6/0038; G02B 6/005; G02B 6/0051; G02B 6/0053; G02F 1/133615
See application file for complete search history.

(56) References Cited

U.S. PATENT DOCUMENTS

| | | | | |
|---|---|---|---|---|
| 5,587,816 | A * | 12/1996 | Gunjima | G02B 6/0056 349/9 |
| 6,364,497 | B1 * | 4/2002 | Park | G02B 6/0053 362/23.15 |
| 6,854,857 | B2 * | 2/2005 | Hara | G02B 6/005 362/333 |
| 7,692,733 | B2 * | 4/2010 | Daiku | G02B 6/0038 362/602 |
| 7,726,865 | B2 * | 6/2010 | Sato | G02B 6/0053 362/617 |
| 7,841,758 | B2 * | 11/2010 | Lai | G02B 6/005 362/606 |
| 8,456,591 | B2 * | 6/2013 | Oshima | G02F 1/133606 362/607 |
| 9,261,640 | B2 * | 2/2016 | Koike | G02B 5/045 |
| 9,261,731 | B2 * | 2/2016 | Koike | G02F 1/1337 |
| 2016/0259115 | A1 * | 9/2016 | Kitano | G02B 5/0242 |
| 2018/0052274 | A1 | 2/2018 | Nichol et al. | |

FOREIGN PATENT DOCUMENTS

| | | |
|---|---|---|
| CN | 109031512 | 12/2018 |
| CN | 111338128 | 6/2020 |
| KR | 20080001236 | 1/2008 |
| KR | 20170084888 | 7/2017 |
| WO | 2011108038 | 9/2011 |

* cited by examiner

DISPLAY BACKLIGHT WITH TRANSPARENT LIGHT GUIDE

CROSS-REFERENCE TO RELATED APPLICATION

This application is a 371 of international application of PCT application serial no. PCT/CN2021/000074, filed on Apr. 9, 2021, which claims the priority benefit of China application no. 202010278218.9, filed on Apr. 10, 2020. The entirety of each of the above mentioned patent applications is hereby incorporated by reference herein and made a part of this specification.

TECHNICAL FIELD

The invention relates to a light source system for a display device, in particular to a transparent light source system for a display device.

DESCRIPTION OF RELATED ART

The transparent light source system is a light source system suitable for liquid crystal display devices. The principle of the transparent light source system is as follows: when ambient light is intensive, the ambient light penetrates through the transparent light source system to enter the display device, and then the light with display information is reflected to human eyes; when the ambient light is weak, a transparent light source system emits light, which enters the display device and is then reflected to human eyes, such that human eyes can receive sufficient light to recognize the display information. This technique can effectively increase the energy utilization rate and meet the requirements of energy-saving scenarios.

Patent US20180052274A1 discloses a multi-layer light guide film, as shown in FIG. 1. Micro-structures are formed on a light guide film to destroy the total reflection condition for propagation of light passing through the micro-structures, so the light will be emitted from the other side. Multiple light guide films of such a structure are laminated to form the multi-layer light guide film, and the light guide films are individuals optionally. Such a structure is high in cost, complex in process, and low in efficiency.

Patent CN 109031512 A discloses a light guide film which is of a trapezoidal structure, as shown in FIG. 2. The light guide film and a light guide plate are bonded together through a glue layer, which is equivalent to that an inverted trapezoidal structure exits on the surface of the light guide plate, so light reaching a lateral surface of the inverted trapezoidal structure will be diverged and totally reflected and finally come out of the bottom surface of the trapezoid. According to this light guide film, two layers of structures need to be bonded together through the glue layer, which will greatly compromise the light-emitting effect of the film, and reduce the contrast and the brightness.

Patent CN 108519637 A discloses a light guide plate formed with micro-structures, as shown in FIG. 3. The micro-structures are of a frustum cone shape, and light reaching the surfaces of the micro-structures will be refracted and emitted by the surfaces. The back of the light guide plate of such a structure may leak light. Although a semi-transparent and semi-reflective film can be attached to the back of the light guide plate to restrain light leaking, it will reduce the light transmittivity; in addition, the semi-transparent and semi-reflective film needs to be aligned with the micro-structures on the opposite side, so the process is complex, and the cost is high.

BRIEF SUMMARY OF THE INVENTION

The technical issue to be settled by the invention is to provide a transparent light source system for a display device, which is easy to fabricate, low in cost, and high in light-emitting efficiency.

The technical solution adopted by the invention to settle the above technical issue is as follows: a transparent light source system for a display device comprises a light source and a light guide plate, wherein the light guide plate comprises an incident surface opposite to the light source, an upper surface, a lower surface, and a lateral surface opposite to the incident surface, the upper surface is parallel to the lower surface, an outer light guide film is disposed outside the upper surface, first optical micro-structures allowing light transmitted in the light guide plate to be emitted from the upper surface are disposed on the upper surface, second optical micro-structures opposite to the first optical micro-structures are disposed on an inner surface of the outer light guide film, and the second optical micro-structures allow light emitted out of the first optical micro-structures to be emitted from an outer surface of the outer light guide film.

An inner light guide film is disposed between the light guide plate and the outer light guide film, a lower surface of the inner light guide film is attached to an upper surface of the light guide plate, and the first optical micro-structures are disposed on an upper surface of the inner light guide film.

The outer surface of the outer light guide film is parallel to the lower surface of the inner light guide film.

The first optical micro-structures are multiple first independent strip structures, which are arranged in parallel in a light transmission direction and have a width less than a minimum pixel size of a display device; and the second optical micro-structures are multiple second independent strip structures which are arranged in parallel in the light transmission direction and have a width less than the minimum pixel size of the display device.

The first independent strip structures are correspondingly matched with the second independent strip structures to form multiple parallel independent strip structure units, and the independent strip structure units allow the light transmitted in the light guide plate to be emitted from the outer surface of the outer light guide film.

Each of the independent strip structure units is formed by one first independent strip structure and one second independent strip structure correspondingly matched with the first independent strip structure.

Each of the independent strip structure units is formed by one first independent strip structure and two second independent strip structures correspondingly matched with the first independent strip structure.

The second independent strip structures may be distributed continuously in the light transmission direction, and the first independent strip structures may be distributed discontinuously in the light transmission direction. Or, the first independent strip structures and the second independent strip structures may be distributed discontinuously in the light transmission direction.

The cross-section of the first independent strip structures and the cross-section of the second independent strip structures may be in a convex arc shape and a corresponding arc shape respectively.

The cross-section of the first independent strip structures and the cross-section of the second independent strip structures may be in a convex arc shape and a corresponding triangular shape respectively.

The cross-section of the first independent strip structures and the cross-section of the second independent strip structures may be in a convex arc shape and a corresponding polygonal shape respectively.

The cross-section of the first independent strip structures and the cross-section of the second independent strip structures may be in a convex arc shape and a corresponding trapezoidal shape respectively.

The cross-section of the first independent strip structures and the cross-section of the second independent strip structures may be in a convex triangular shape and a corresponding triangular shape respectively.

The cross-section of the first independent strip structures and the cross-section of the second independent strip structures may be in a convex triangular shape and a corresponding arc shape respectively.

The cross-section of the first independent strip structures and the cross-section of the second independent strip structures may be in a convex triangular shape and a corresponding polygonal shape respectively.

The cross-section of the first independent strip structures and the cross-section of the second independent strip structures may be in a convex triangular shape and a corresponding trapezoidal shape respectively.

The cross-section of the first independent strip structures and the cross-section of the second independent strip structures may be in a convex trapezoidal shape and a corresponding triangular shape respectively.

The cross-section of the first independent strip structures and the cross-section of the second independent strip structures may be of a convex trapezoidal shape and a corresponding arc shape respectively.

The cross-section of the first independent strip structures and the cross-section of the second independent strip structures may be in a convex trapezoidal shape and a corresponding polygonal shape respectively.

The cross-section of the first independent strip structures and the cross-section of the second independent strip structures may be in a convex trapezoidal shape and a corresponding trapezoidal shape respectively.

The cross-section of the first independent strip structures and the cross-section of the second independent strip structures may be in a convex shape and a corresponding complementary shape respectively.

The first independent strip structures and the second independent strip structures are bonded into a whole with an optical adhesive.

A reflecting surface may be disposed on the lateral surface of the light guide plate.

An auxiliary light source may be disposed outside the lateral surface.

The optical micro-structures may be discrete two-dimensional structures which are arranged in a light propagation direction, and the two-dimensional micro-structures may be distributed regularly or irregularly. The cross-section of the two-dimensional structures may be, but not limited to, in a square shape, a hexagonal shape, a circular shape, or a conical shape.

A display device uses the transparent light source system mentioned above, wherein the display device is disposed on an outer side of the outer light guide film.

A reflecting plate is disposed on an outer side of a lower surface of the light guide plate.

Compared with the prior art, the invention has the following advantages: the light-emitting unidirectionality is good, and light is emitted in only one direction; optical films are formed once, the process difficulty is low, and the product yield is high; and the inner light guide film and the light guide plate can be combined, the product can be formed integrally, the process is simple, and the cost is low.

DETAILED DESCRIPTION OF THE INVENTION

The invention will be described in further detail below in conjunction with the accompanying drawings and embodiments.

Figure 1:
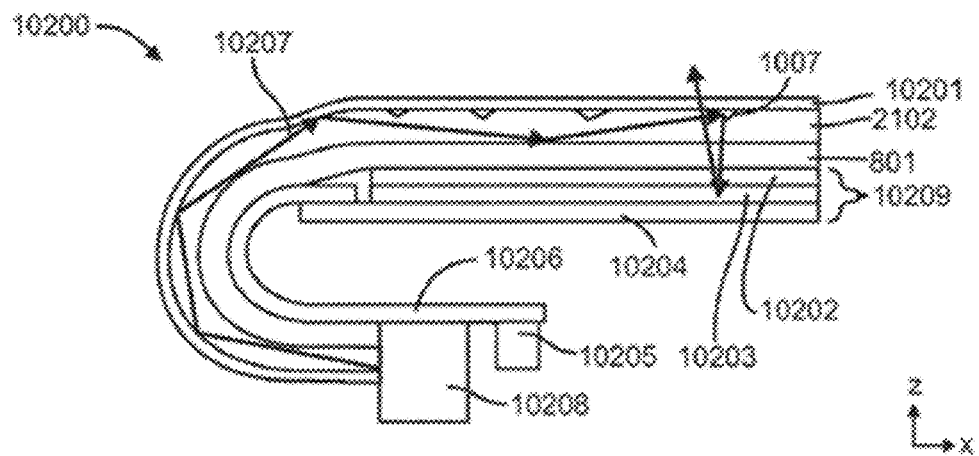
FIG. 1 is a structural diagram of US Patent US20180052274A1.
Figure 2:
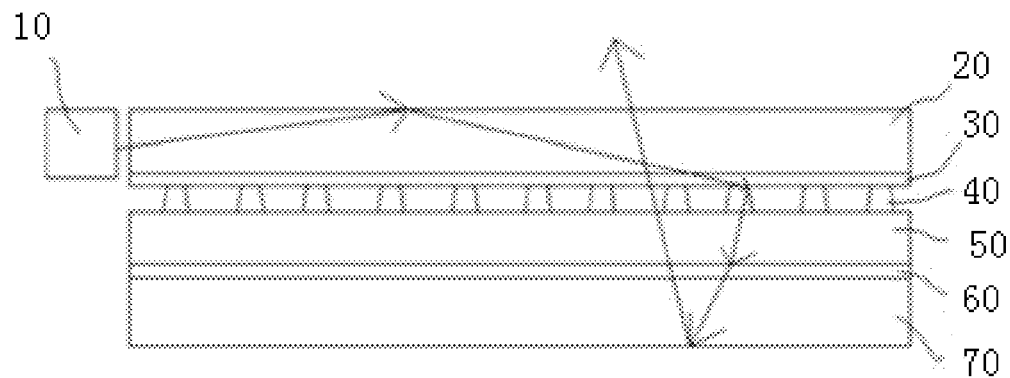
FIG. 2 is a structural diagram of Chinese Patent CN 109031512A.
Figure 3:
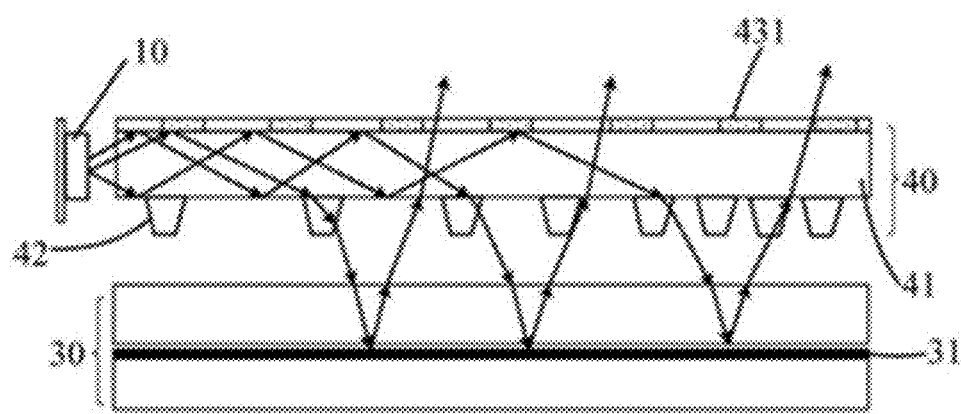
FIG. 3 is a structural diagram of Chinese Patent CN 108519637 A.
Figure 4A:
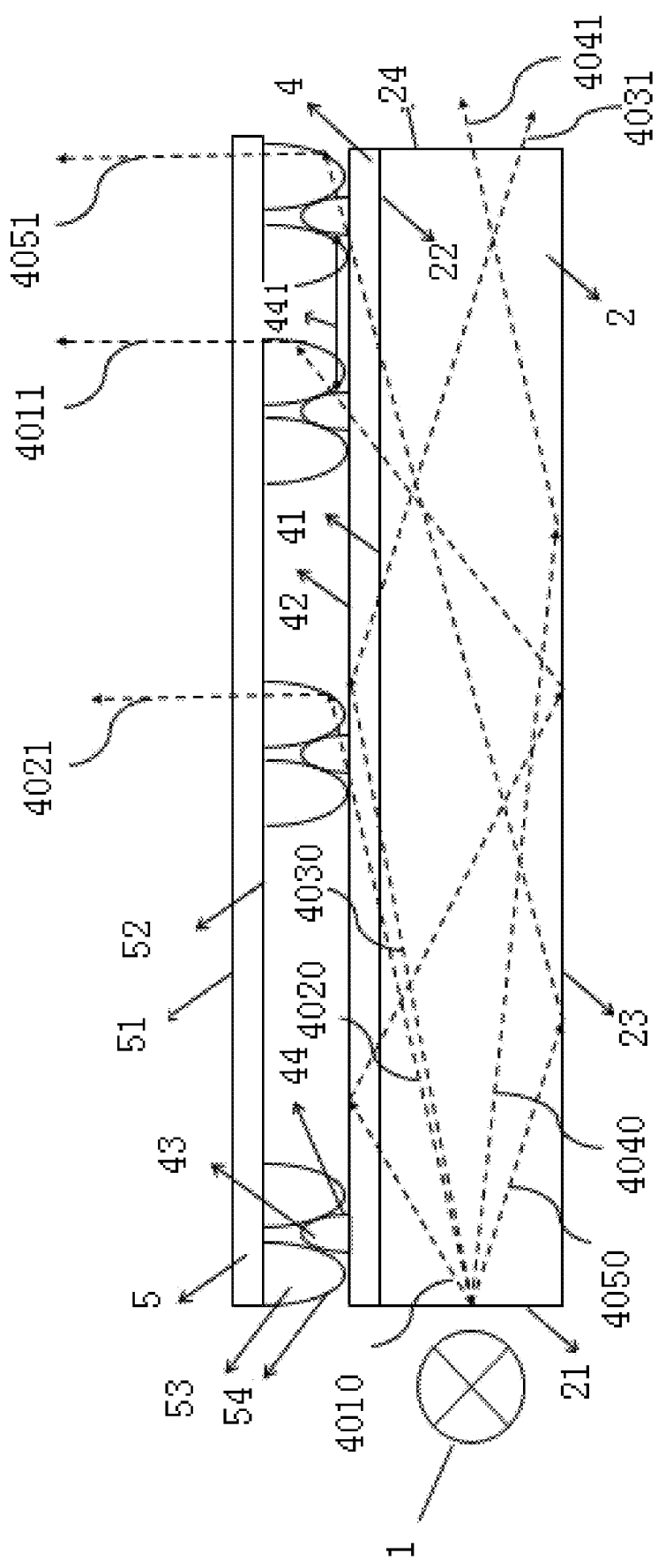
FIG. 4A is a planar structural view of Embodiment 1 of the invention.

Embodiment 1: As shown in FIG. 4A, a transparent light source system for a display device comprises a light source 1 and a light guide plate 2, wherein the light guide plate 2 is a parallel plate and comprises an incident surface 21 opposite to the light source 1, an upper surface 22, a lower surface 23, and a lateral surface 24 opposite to the incident surface 21, the upper surface 22 is parallel to the lower surface 23, the lateral surface 24 is a slope or is parallel to the incident surface 21, an inner light guide film 4 is disposed on the upper surface 22, a lower surface 41 of the inner light guide film 4 is attached to the upper surface 22 of the light guide plate 2, first optical micro-structures 43 are disposed on an upper surface of the inner light guide film 4 and allow light transmitted in the light guide plate 2 to be emitted from the upper surface 22 of the light guide plate 2, the first optical micro-structures 43 are multiple first independent strip structures which are arranged in parallel in a light transmission direction, and are arranged on the upper surface 42 of the inner light guide film 4 through UV molding, the width of the first independent strip structures 43 is less than a minimum pixel size of a display device, an interval 441 between every two adjacent first independent strip structures is twice greater than the width of the first independent strip structures 43, an outer light guide film 5 is disposed on an outer side of the inner light guide film 4, an outer surface 51 of the outer light guide film 5 is parallel to the lower surface 41 of the inner light guide film 4, and second optical micro-structures 53 opposite to the first optical micro-structures 43 are disposed on an inner surface 52 of the outer light guide film 5 and allow light emitted out of the first optical micro-structures 43 to be emitted from the outer surface 51 of the outer light guide film 5. The second optical micro-structures 53 are multiple second independent strip structures which are arranged in parallel in the light transmission direction, and are arranged on the inner surface 52 of the outer light guide film 5 through UV molding, and the width of the second independent strip structures is less than the minimum pixel size of the display device.

The inner light guide film 4 and the outer light guide film 5 are made from polyethylene terephthalate, polycarbonate, polymethyl methacrylate, or other transparent compound materials.

The first optical micro-structures 43 and the second micro-structures 53 are made from acrylic resin, epoxy resin, or silicone rubber, and the first optical micro-structures 43 and the second micro-structures 53 may be machined and made from polycarbonate or polymethyl methacrylate through integrated injection molding.

The light guide plate 2 may be made from polymethyl methacrylate, polycarbonate, glass, or the like.

The cross-section of the first independent strip structures is in a convex arc shape, and the cross-section of the second independent strip structures is in a convex arc shape.

As shown in FIG. 4A, the working principle of this embodiment is as follows:

Light emitted by the light source 1 enters the light guide plate 2, and according to the Fresnel reflection law, light will be totally reflected at an interface with air when propagating in a parallel medium, for example, light 4010 continues to propagate in the light guide plate 2 after being reflected by a first interface (42) and a second interface (23) (the refractivity of the inner light guide film 4 may be the same as or different from that of the light guide plate 2, which has no influence on the total reflection condition of light in the medium). When light (such as light 4020 and light 4050) enters the first strip-shaped optical micro-structures 43 of an arc structure in the propagating process, the interface condition can no longer meet the total reflection condition, so the light will be emitted out of the surfaces 44 of the first optical micro-structures 43 to enter the second optical micro-structures 53 of the outer light guide film, wherein contours 54 of the second strip-shaped optical micro-structures 53 are of an arc structure, and should meet the condition that the angle of incidence of light emitted to the surfaces of the second optical micro-structures 53 is greater than or equal to the angle of total reflection; the light emitted to the contours 54 is refracted out of the second optical micro-structures 53 and is emitted from the outer surface 51 (such as light 4011, light 4021 and light 4051); if light (such as light 4030 and light 4040) does not enter the first optical micro-structures 43 in the propagation process, the light will continue to propagate in the light guide plate 2 until the light reaches the lateral surface 24 to be emitted out of the light guide plate 2. All the light will be emitted from the outer surface 51 of the outer light guide film 5. Generally, the first optical micro-structures 43 and the second optical micro-structures 53 are formed on the inner light guide film 4 and the outer light guide film 5 with the refractivity being greater than that of the light guide plate, that is, a layer of optical materials is disposed between the light guide plate 2 and the first optical micro-structures 43, and the inner light guide film 4 and the light guide plate 2 are bonded with an optical adhesive. The intervals between the first independent strip structures and the second independent strip structures may be regular or irregular. In addition, the emergent surface (outer surface 51) of the outer light guide film 5 may be coated with the optical adhesive, and the entire outer light guide film may be directly attached to a liquid crystal panel, such that optical interfaces can be further reduced.

The first independent strip structures are correspondingly matched with the second independent strip structures to form multiple parallel independent strip structure units. Each independent strip structure unit is formed by one first independent strip structure and one second independent strip structure correspondingly matched with the first independent strip structure, or is formed by one independent strip structure and two second independent strip structures correspondingly matched with the first independent strip structure.

Figure 4B:
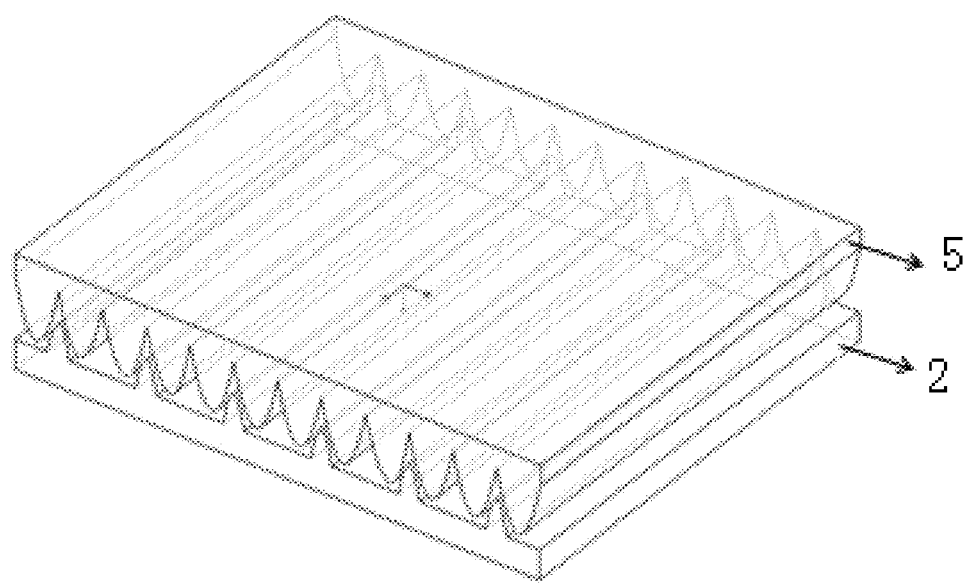
FIG. 4B is a three-dimensional structural view of Embodiment 1 of the invention.

In addition to the independent strip structure units formed by arc-shaped first independent strip structures and arc-shaped second independent strip structures shown in FIG. 4A and FIG. 4B, other examples of the independent strip structure units are disclosed in FIG. 5A to FIG. 5L.

Figure 5A:
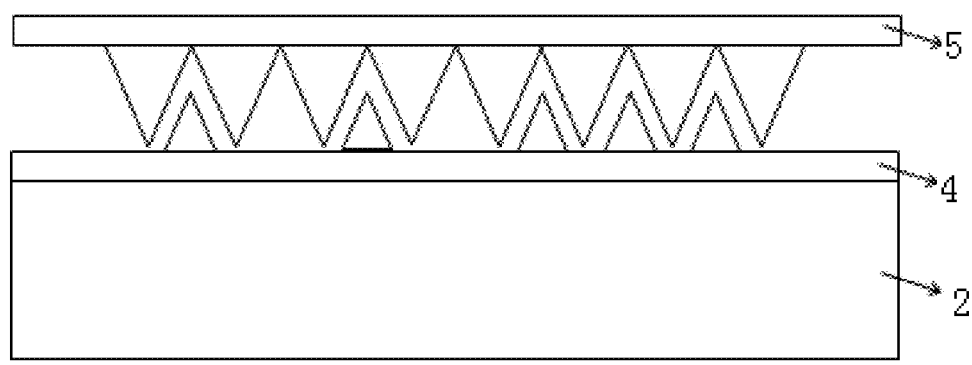
FIG. 5A is a structural diagram of Example 1 of Embodiment 1 of the invention.

In Example 1 illustrated by FIG. 5A, the independent strip structure units are formed by first independent strip structures in triangular shape and second independent strip structures in triangular shape.

Figure 5B:
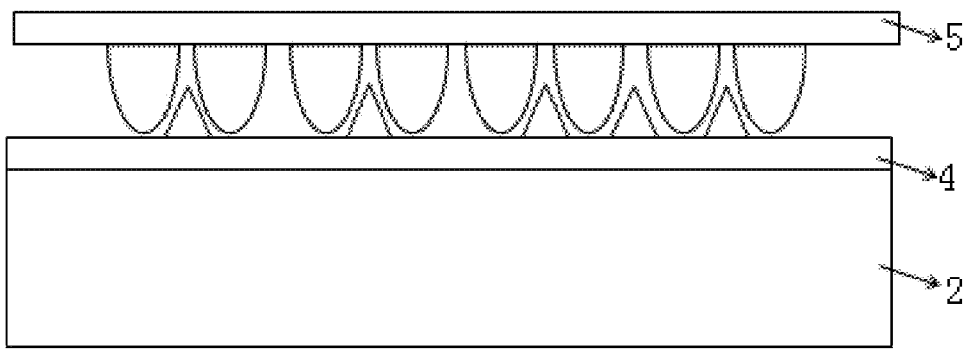
FIG. 5B is a structural diagram of Example 2 of Embodiment 1 of the invention.

In Example 2 illustrated by FIG. 5B, the independent strip structure units are formed by first independent strip structures in triangular shape and second independent strip structures in arc shape.

Figure 5C:
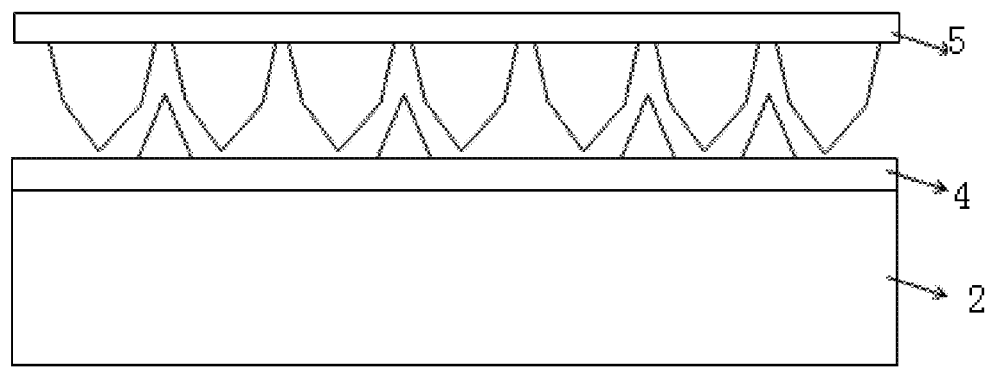
FIG. 5C is a structural diagram of Example 3 of Embodiment 1 of the invention.

In Example 3 illustrated by FIG. 5C, the independent strip structure units are formed by first independent strip structures in triangular shape and second independent strip structures in polygonal shape.

Figure 5D:
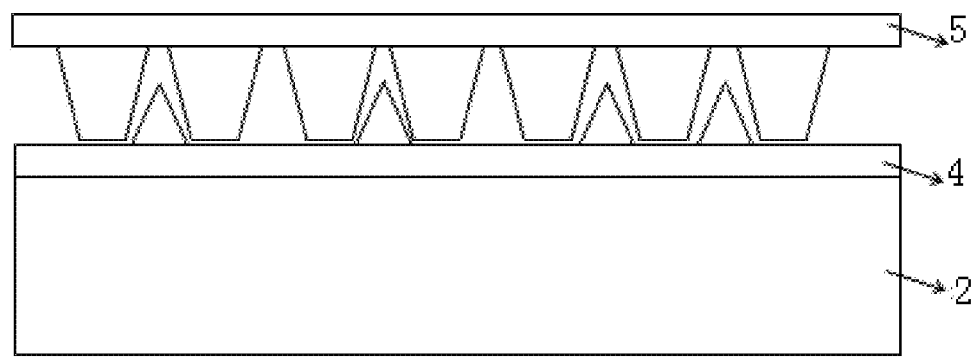
FIG. 5D is a structural diagram of Example 4 of Embodiment 1 of the invention.

In Example 4 illustrated by FIG. 5D, the independent strip structure units are formed by first independent strip structures in triangular shape and second independent strip structures in trapezoidal shape.

Figure 5E:
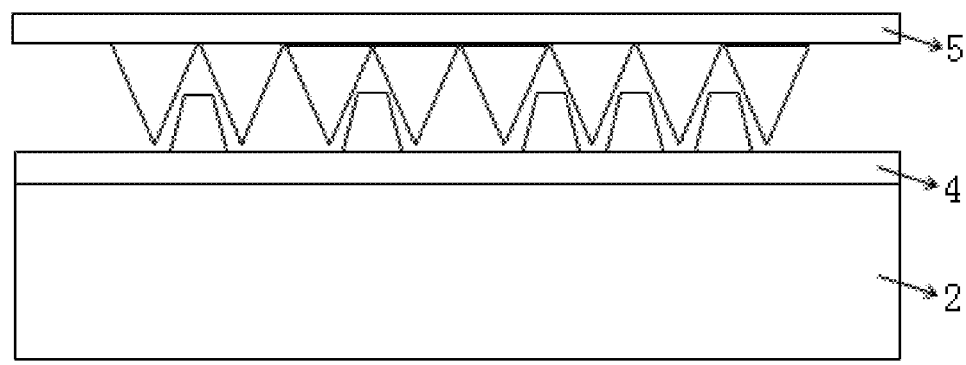
FIG. 5E is a structural diagram of Example 5 of Embodiment 1 of the invention.

In Example 5 illustrated by FIG. 5E, the independent strip structure units are formed by first independent strip structures in trapezoidal shape and second independent strip structures in triangular shape.

Figure 5F:
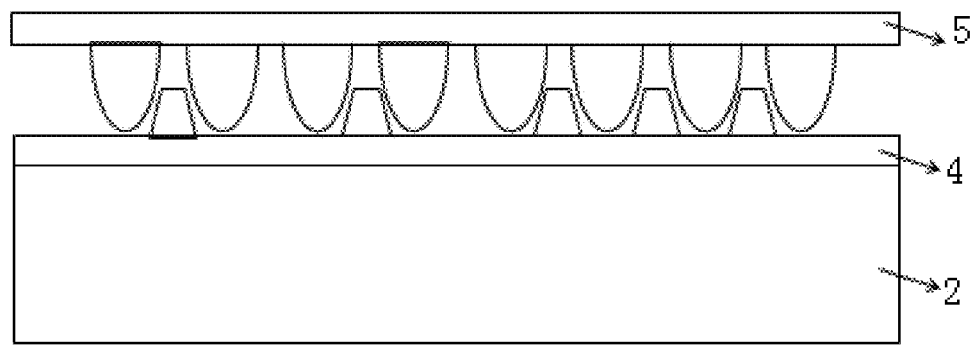
FIG. 5F is a structural diagram of Example 6 of Embodiment 1 of the invention.

In Example 6 illustrated by FIG. 5F, the independent strip structure units are formed by first independent strip structures in trapezoidal shape and second independent strip structures in arc shape.

Figure 5G:
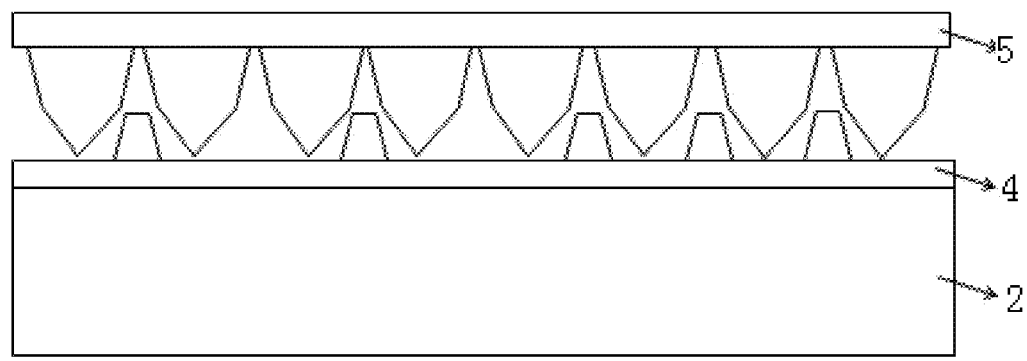
FIG. 5G is a structural diagram of Example 7 of Embodiment 1 of the invention.

In Example 7 illustrated by FIG. 5G, the independent strip structure units are formed by first independent strip structures in trapezoidal shape and second independent strip structures in polygonal shape.

Figure 5H:
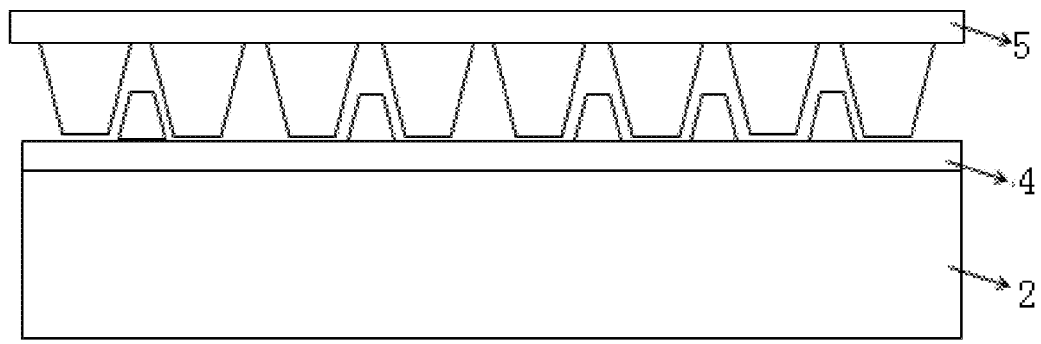
FIG. 5H is a structural diagram of Example 8 of Embodiment 1 of the invention.

In Example 8 illustrated by FIG. 5H, the independent strip structure units are formed by first independent strip structures in trapezoidal shape and second independent strip structures in trapezoidal shape.

Figure 5I:
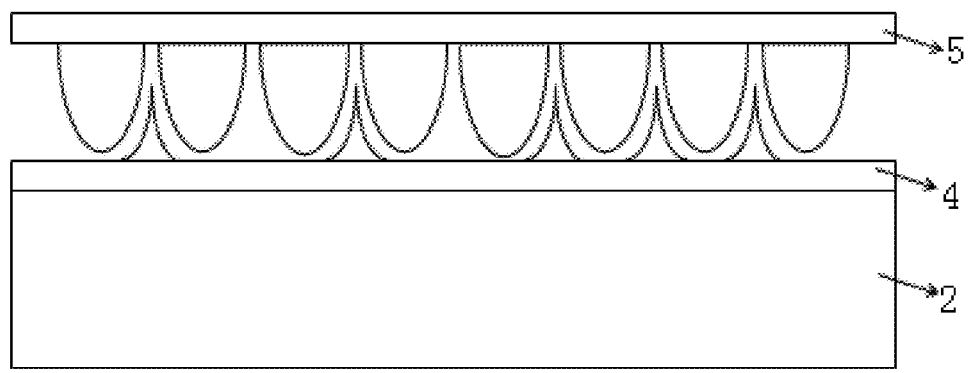
FIG. 5I is a structural diagram of Example 9 of Embodiment 1 of the invention.

In Example 9 illustrated by FIG. 5I, the independent strip structure units are formed by first independent strip structures and second independent strip structures in a reversed form with respect to Example 8.

Figure 5J:
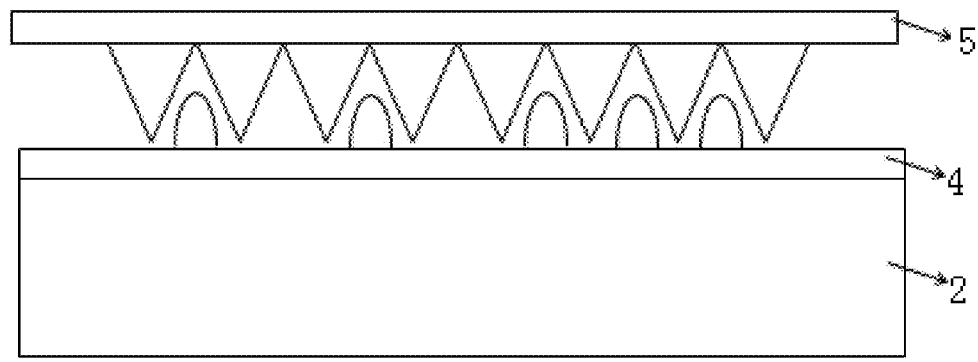
FIG. 5J is a structural diagram of Example 10 of Embodiment 1 of the invention.

In Example 10 illustrated by FIG. 5J, the independent strip structure units are formed by first independent strip structures in arc shape and second independent strip structures in triangular shape.

Figure 5K:
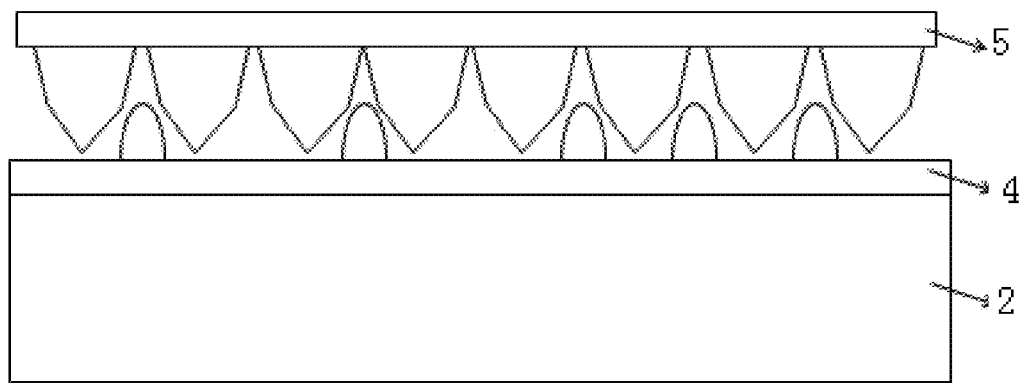
FIG. 5K is a structural diagram of Example 11 of Embodiment 1 of the invention.

In Example 11 illustrated by FIG. 5K, the independent strip structure units are formed by first independent strip structures in arc shape and second independent strip structures in polygonal shape.

Figure 5L:
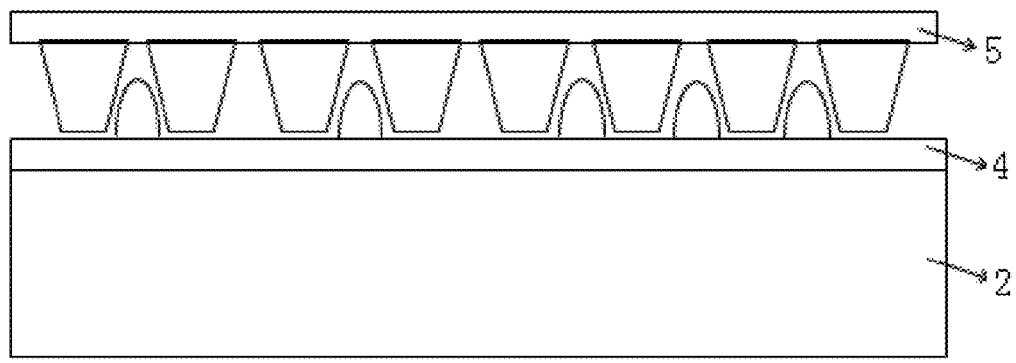
FIG. 5L is a structural diagram of Example 12 of Embodiment 1 of the invention.

In Example 12 illustrated by FIG. 5L, the independent strip structure units are formed by first independent strip structures in arc shape and second independent strip structures in trapezoidal shape.

Figure 6:
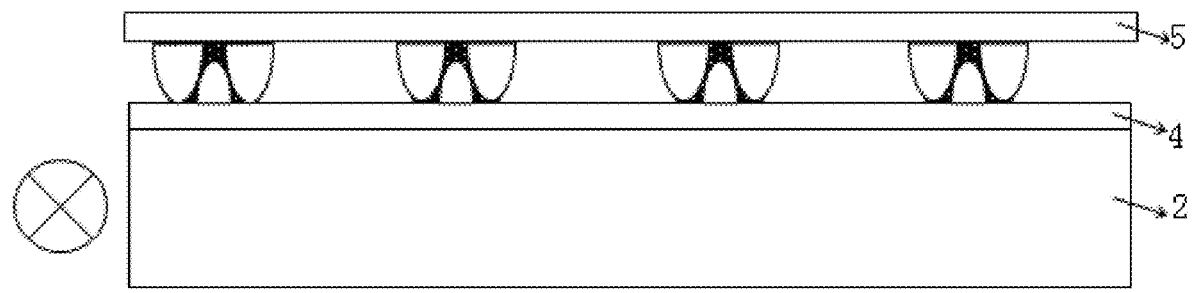
FIG. 6 is a bonding diagram of an inner light guide film and an outer light guide film in Embodiment 1 of the invention.

As shown in FIG. 6, the first optical micro-structures 43 may be matched with the second optical micro-structures by bonding the inner light guide film 4 and the outer light guide film with an optical adhesive, such that the inner light guide film 4 and the outer light guide film 5 can be integrated without an optical interface.

Figure 7:
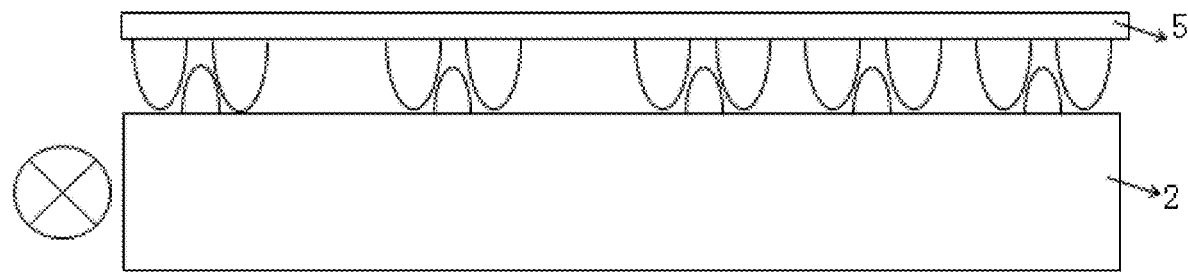
FIG. 7 is a structural diagram of Embodiment 2 of the invention.

Embodiment 2: As shown in FIG. 7, the first optical micro-structures 43 on the inner light guide film 4 are directly formed on the light guide plate 2, or a thick inner light guide film is directly used as the light guide plate, such that an interface between the inner light guide film 43 and the light guide plate 2 in Embodiment 1 is omitted, materials are saved, and the interface loss is reduced. When the light guide film is used as the light guide plate, the light guide film should be made from a material with good light transmittance, which may otherwise lead to an excessive optical loss due to a long light path in the medium.

Figure 8:
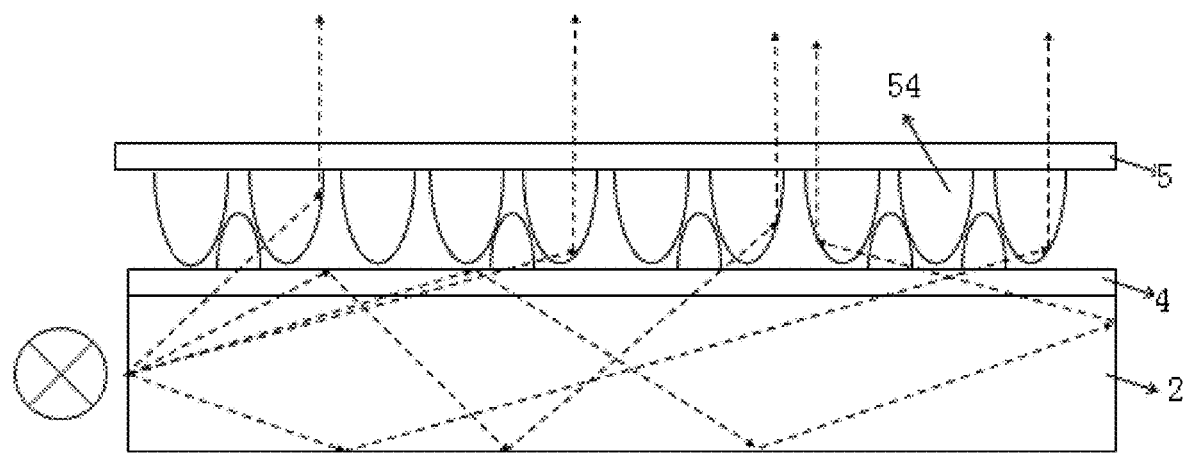
FIG. 8 is a structural diagram of Embodiment 3 of the invention.

Embodiment 3: As shown in FIG. 8, the second optical micro-structures 53 on the outer light guide film 5 in Embodiment 1 may be second independent strip structures which are distributed continuously rather than the second independent strip structures which are distributed discontinuously, as shown in FIG. 4A to FIG. 7.

Figure 9A:
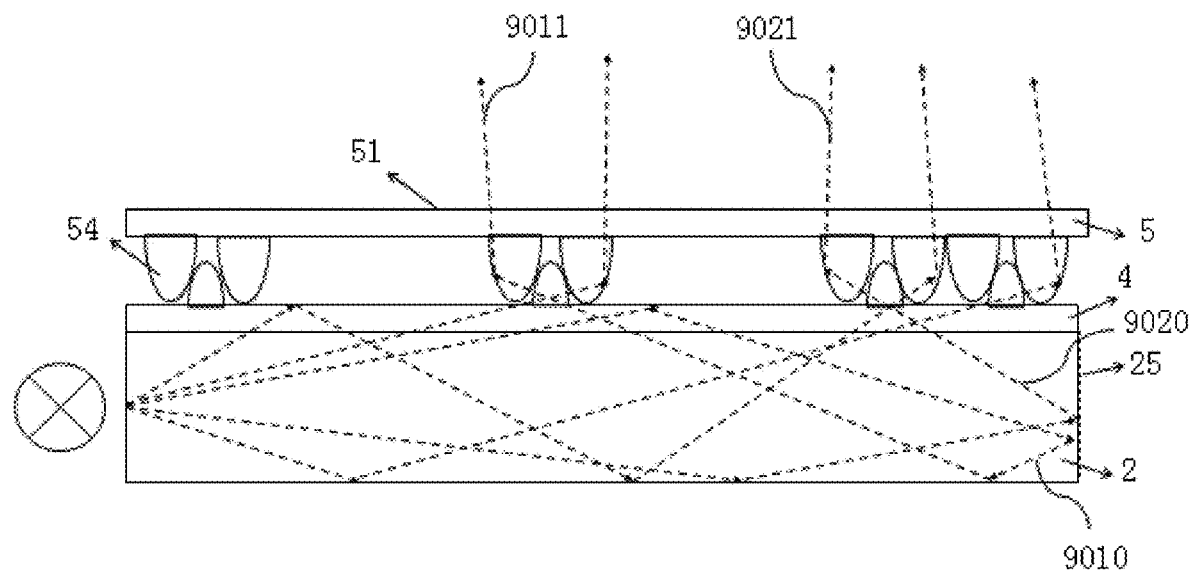
FIG. 9A is a schematic diagram of unidirectionally reflected light in Example 1 Embodiment 4 of the invention.
Figure 9B:
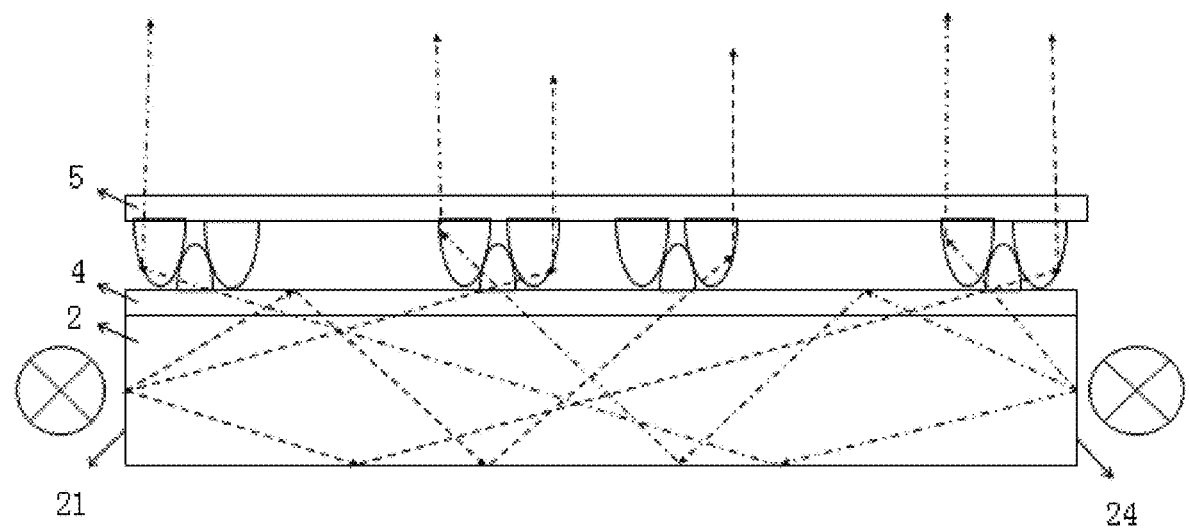
FIG. 9B is a schematic diagram of bidirectional incident light in Example 2 of Embodiment 4 of the invention.

Embodiment 4: In Example 1 illustrated by FIG. 9A, in the structure of Embodiment 1, a reflecting surface 25 is disposed on the lateral surface 24 of the light guide plate 2, light emitted to the lateral surface 24 is reflected and then enters the light guide plate 2 to propagate again, then enters the first optical micro-structures 43 of the inner light guide film 4, and finally, is reflected out of the emergent surface 51 by the second optical micro-structures 53 of the outer light guide film 5, such as light 9010 and light 9020, the process of which is the same as the description in Embodiment, but the direction is opposite. Or, in Example 2 illustrated by FIG. 9B, an auxiliary light source is disposed on the lateral surface 24 of the light guide plate 2, the first independent strip structures and the second independent strip structures are distributed symmetrically, and the light refraction principle and process are the same as described above.

Figure 10A:
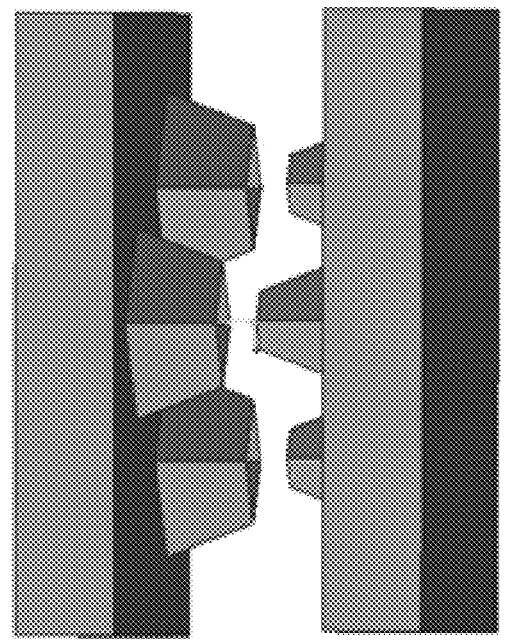
FIG. 10A is a structural diagram of Example 1 of Embodiment 5 of the invention.
Figure 10A:
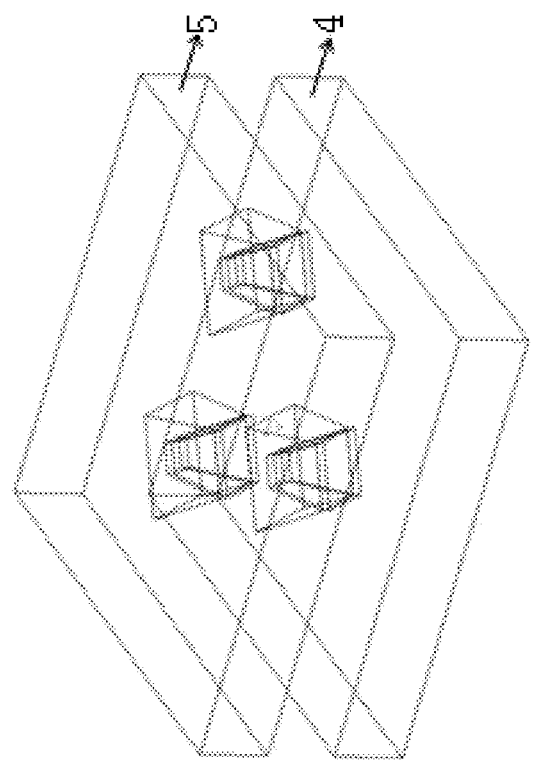
Figure 10B:
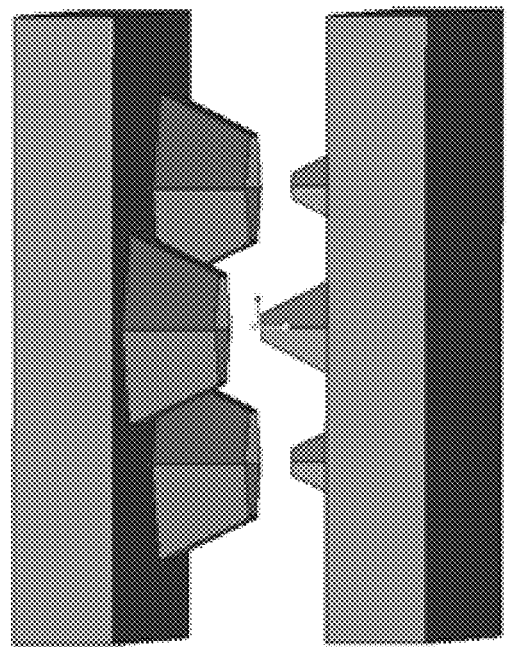
FIG. 10B is a structural diagram of Example 2 of Embodiment 5 of the invention.
Figure 10B:
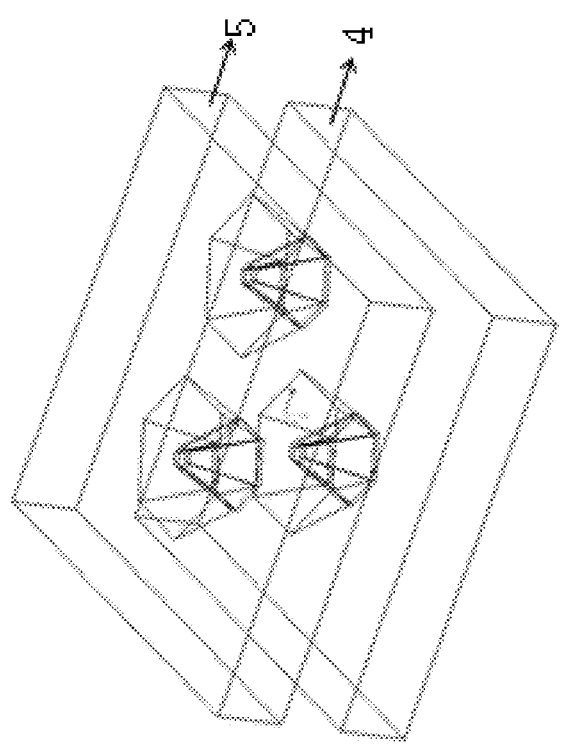
Figure 10C:
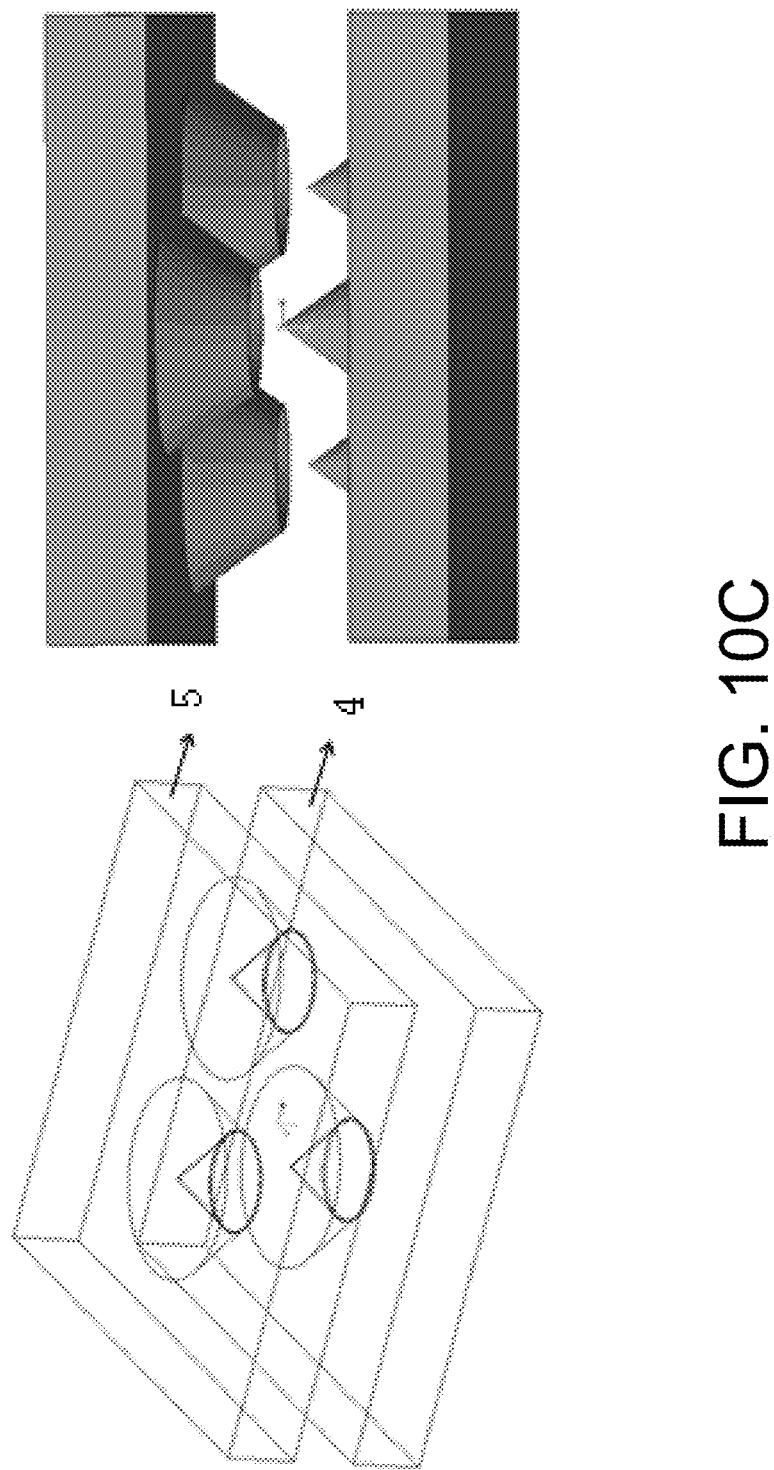
FIG. 10C is a structural diagram of Example 3 of Embodiment 5 of the invention.

Embodiment 5: As shown in FIG. 10A to FIG. 10C, the first optical micro-structures 43 on the inner light guide film 4 and the second optical micro-structures 53 on the outer light guide film 5 may be two-dimensional structures.

In Example 1 illustrated by FIG. 10A, the first optical micro-structures 43 and the second optical micro-structures 53 are tetrahedral. In Example 2 illustrated by FIG. 10B, the first optical micro-structures 43 and the second optical micro-structures 53 are hexahedral. In Example 3 illustrated by FIG. 10C, the first optical micro-structures 43 and the second optical micro-structures 53 are conical. The optical micro-structures are distributed regularly or irregularly.

In this embodiment, the strip-shaped or two-dimensional optical micro-structures may be fabricated through hot-press molding, injection molding, or laser etching, may be sparsely arranged in an array on a side close to the light source, densely arranged in an array on a side away from the light source, or arranged regularly, and may be made from acrylic resin, epoxy resin, polycarbonate or the like, and the refractivity of the strip-shaped or two-dimensional optical micro-structures is the same as or less than the refractivity of the light guide plate.

Embodiment 6: The invention provides use of a transparent light source system.

Figure 11A:
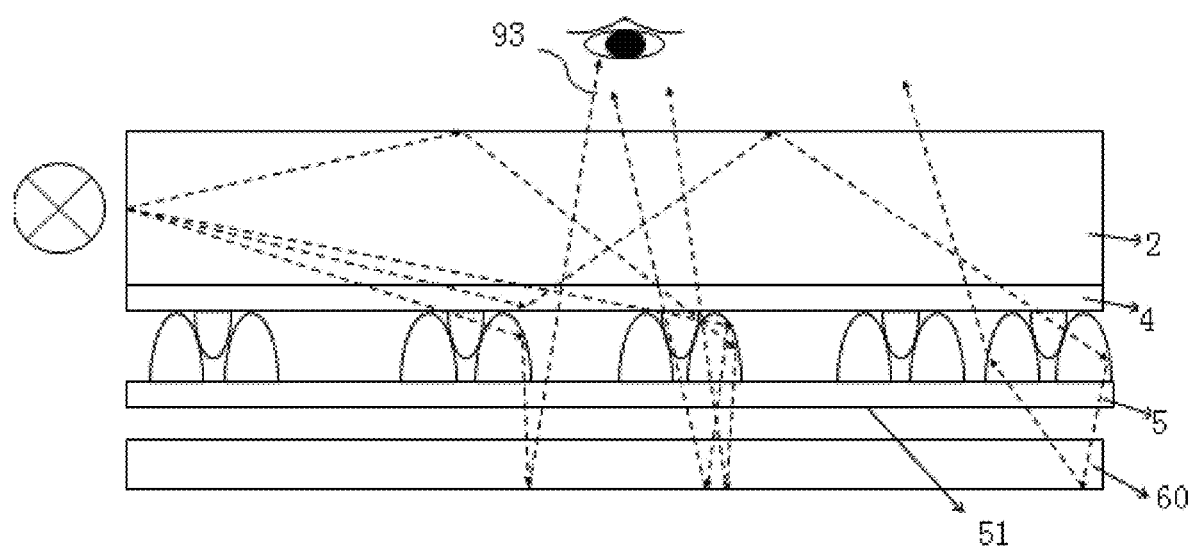
FIG. 11A is a schematic diagram of the final light observation effect of a reflective display device using the transparent light source system according to the invention.

Example 1: As shown in FIG. 11A, a display device 60 and the transparent light source system are included, wherein the transparent light source system is disposed on a display side (upper side) of the display device 60, and the outer surface 51 of the outer light guide film 5 in the transparent light source system is arranged opposite to the display device 60. The display device 60 is a reflective display device, a liquid crystal layer is disposed in the display device 60, and a lower surface of the display device 60 is a reflecting surface. Light emitted by the transparent light source system reaches the display device 60, enters the display device 60, and is reflected back to the transparent light source system by the lower surface after passing through the liquid crystal layer, and the light penetrates through the light guide plate 2, the inner light guide film 4 and the outer light guide film 5 to be observed by an observer, such as light 93 shown in FIG. 11A. Because the outer surface 51 of the outer light guide film 5 is a plane, the transparent light source system can be entirety attached to the display device 60 to reduce optical interface losses and eliminate physical friction between the films. The angle of emergence of the transparent light source system can be customized by changing optical micro-structures on the inner light guide film 4 and the outer light guide film 5 according to the requirements of the display device 60.

Figure 11B:
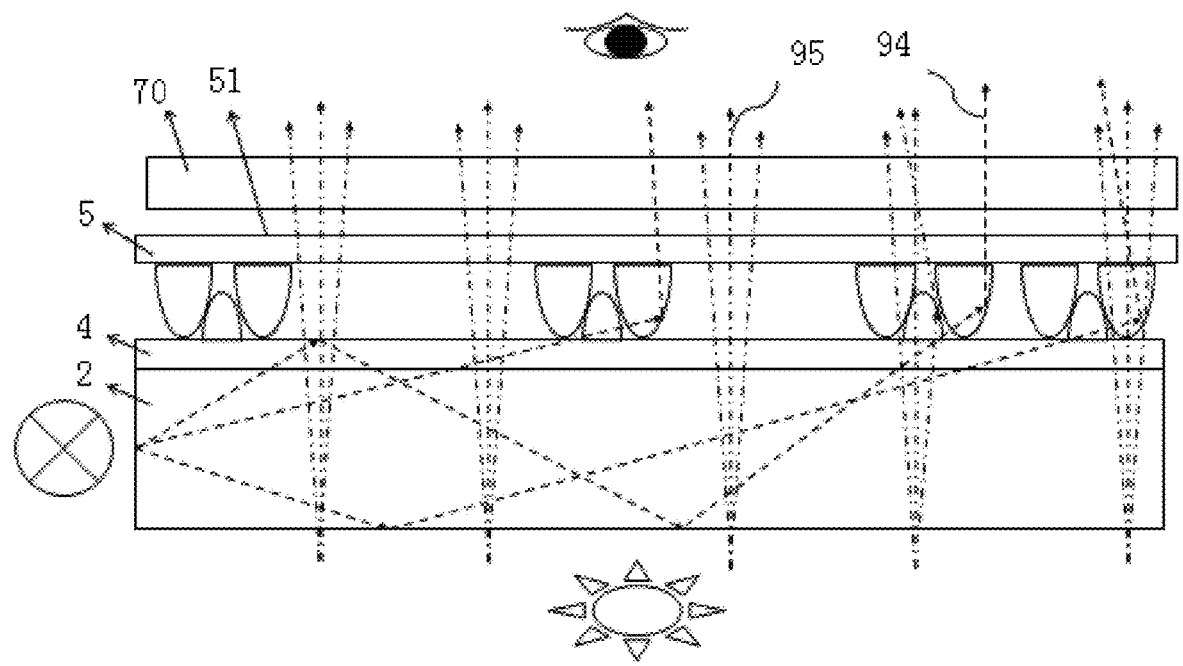
FIG. 11B is a schematic diagram of the final light observation effect of a transparent display device using the transparent light source system according to the invention.

Example 2: As shown in FIG. 11B, a transparent display device 70, an article to be displayed, and the transparent light source system are included, wherein the transparent light source system is disposed below a display side of the transparent display device 70, the outer surface 51 of the outer light guide film 5 in the transparent light source system is arranged opposite to the transparent display device 70, and the article to be displayed is placed below the transparent light source system. A liquid crystal layer is disposed in the transparent display device 70, and upper and lower surfaces of the transparent display device 70 are transparent surfaces. Light emitted by the transparent light source system reaches the transparent display device 70, enters the transparent display device 70, passes through the liquid crystal layer, and then enters the observation range of an observer, such as light 94 shown in FIG. 11B. Light emitted or reflected by the article to be displayed reaches the transparent light source system, and then penetrates through the inner light guide film 4, the outer light guide film 5, the light guide plate 2, and the transparent display device 70 to enter the observation range of the observer, such as light 95 shown in FIG. 11B. The observer not only can observe information of the transparent display device 70, but also can observe the article to be displayed through the transparent display device 70 and the transparent light source system. Because the outer surface 51 of the outer light guide film 5 is a plane, the transparent light source system can be entirely attached to the display device 70 to reduce optical interface losses and eliminate physical friction between the films. The angle of emergence of the transparent light source system can be customized by changing the optical micro-structures on the inner light guide film 4 and the outer light guide film 5 according to the requirements of the display device 70.

Figure 11C:
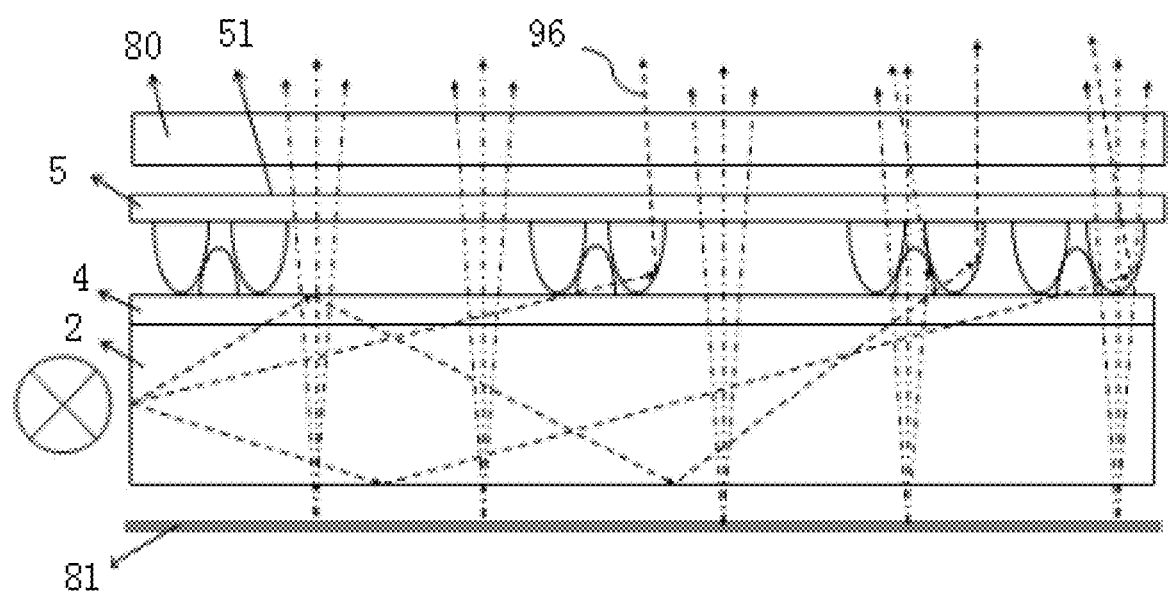
FIG. 11C is a schematic diagram of the final light observation effect of a transmissive display device using the transparent light source system according to the invention.

Example 3: As shown in FIG. 11C, a transmissive display device 80, a reflecting plate 81, and the transparent light source system are included, wherein the transparent light source system is disposed below the transmissive display device 80, the outer surface 51 of the outer light guide film 5 in the transparent light source system is arranged opposite to the transmissive display device 80, the reflecting plate 81 is disposed on one side of the light guide plate 2 in the transparent light source system, and the transparent light source system is located between the reflecting plate 81 and the display device 80. A liquid crystal layer is disposed in the transmissive display device 80. Light emitted by the transparent light source system reaches the transmissive display device 80, passes through the liquid crystal layer, and then enters the observation range of an observer, such as light 96 in FIG. 11C. Light leaking from the bottom of the light guide plate 2 will be reflected back by the reflecting plate 81 under the reflection action of an optical interface, such that the optical efficiency of a module is improved. Because the outer surface 51 of the outer light guide film 5 is planar, the transparent light source system can be entirely attached to the display device 80 to reduce optical interface losses and eliminate physical friction between the films. The angle of emergence of the transparent light source system can be customized by changing the optical micro-structures on the inner light guide film 4 and the outer light guide film 5 according to the requirements of the display device 80.

What is claimed is:

1. A transparent light source system for a display device, comprising:
    a light source;
    a light guide plate having an incident surface facing the light source, an upper surface, a lower surface opposite and parallel to the upper surface, and a lateral surface facing the incident surface;
    an outer light guide film is disposed over the upper surface;
    first optical micro-structures disposed on the upper surface, and configured to allow light transmitted in the light guide plate to be emitted from the upper surface;
    second optical micro-structures facing the first optical micro-structures are disposed on an inner surface of the outer light guide film, and configured to allow light emitted out of the first optical micro-structures to be emitted from an outer surface of the outer light guide film,
    wherein the first optical micro-structures are multiple first independent strip structures, which are arranged in parallel in a light transmission direction and have a width less than a minimum pixel size of a display device; and the second optical micro-structures are multiple second independent strip structures which are arranged in parallel in the light transmission direction and have a width less than the minimum pixel size of the display device,
    wherein the first independent strip structures are correspondingly matched with the second independent strip structures to form multiple parallel independent strip structure units, and the independent strip structure units allow the light transmitted in the light guide plate to be emitted from the outer surface of the outer light guide film,
    wherein each of the independent strip structure units is formed by one of the first independent strip structure and two of the second independent strip structures correspondingly matched with the first independent strip structure.

2. The transparent light source system for a display device according to claim 1, wherein the first independent strip structures and the second independent strip structures are bonded into a whole with an optical adhesive.

3. The transparent light source system for a display device according to claim 1, wherein a reflecting surface is disposed on the lateral surface of the light guide plate.

4. The transparent light source system for a display device according to claim 1, wherein an auxiliary light source is disposed outside the lateral surface.

5. A display device using the transparent light source system according to claim 1, wherein the display device is disposed on an outer side of the outer light guide film.

6. The display device according to claim 5, wherein a reflecting plate is disposed on an outer side of a lower surface of the light guide plate.

7. The transparent light source system for a display device according to claim 1, wherein an inner light guide film is disposed between the light guide plate and the outer light guide film, a lower surface of the inner light guide film is attached to an upper surface of the light guide plate, and the first optical micro-structures are disposed on an upper surface of the inner light guide film.

8. The transparent light source system for a display device according to claim 7, wherein the first optical micro-structures are multiple first independent strip structures, which are arranged in parallel in a light transmission direction and have a width less than a minimum pixel size of a display device; and the second optical micro-structures are multiple second independent strip structures which are arranged in parallel in the light transmission direction and have a width less than the minimum pixel size of the display device.

9. The transparent light source system for a display device according to claim 8, wherein the first independent strip structures are correspondingly matched with the second independent strip structures to form multiple parallel independent strip structure units, and configured to allow the light transmitted in the light guide plate to be emitted from the outer surface of the outer light guide film.

10. The transparent light source system for a display device according to claim 9, wherein each of the independent strip structure units is formed by one of the first independent strip structure and one of the second independent strip structure correspondingly matched with the first independent strip structure.

11. The transparent light source system for a display device according to claim 9, wherein each of the independent strip structure units is formed by one of the first independent strip structure and two of the second independent strip structures correspondingly matched with the first independent strip structure.

12. The transparent light source system for a display device according to claim 9, wherein the first independent strip structures and the second independent strip structures are bonded into a whole with an optical adhesive.

13. The transparent light source system for a display device according to claim 7, wherein the outer surface of the outer light guide film is parallel to the lower surface of the inner light guide film.

14. The transparent light source system for a display device according to claim 13, wherein the first optical micro-structures are multiple first independent strip structures, which are arranged in parallel in a light transmission direction and have a width less than a minimum pixel size of a display device; and the second optical micro-structures are multiple second independent strip structures which are arranged in parallel in the light transmission direction and have a width less than the minimum pixel size of the display device.

15. The transparent light source system for a display device according to claim 14, wherein the first independent strip structures are correspondingly matched with the second independent strip structures to form multiple parallel independent strip structure units, and configured to allow the light transmitted in the light guide plate to be emitted from the outer surface of the outer light guide film.

16. The transparent light source system for a display device according to claim 15, wherein each of the independent strip structure units is formed by one of the first independent strip structure and one of the second independent strip structure correspondingly matched with the first independent strip structure.

* * * * *